(12) United States Patent
Ratti et al.

(10) Patent No.: US 12,131,276 B2
(45) Date of Patent: Oct. 29, 2024

(54) DATA-DRIVEN SYSTEM FOR OPTIMAL VEHICLE FLEET DIMENSIONING AND REAL-TIME DISPATCHING BASED ON SHAREABILITY NETWORKS

(71) Applicant: Massachusetts Institute of Technology, Cambridge, MA (US)

(72) Inventors: Carlo Filippo Ratti, Cambridge, MA (US); Giovanni Resta, Vecchiano (IT); Paolo Santi, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/409,653

(22) Filed: Jan. 19, 2017

(65) Prior Publication Data
US 2018/0204158 A1    Jul. 19, 2018

(51) Int. Cl.
| | |
|---|---|
| G06Q 10/00 | (2023.01) |
| G06Q 10/0631 | (2023.01) |
| G06Q 50/00 | (2024.01) |
| G06Q 50/40 | (2024.01) |
| G08G 1/00 | (2006.01) |

(52) U.S. Cl.
CPC . *G06Q 10/06313* (2013.01); *G06Q 10/06315* (2013.01); *G06Q 50/40* (2024.01); *G08G 1/202* (2013.01)

(58) Field of Classification Search
CPC ... G08G 1/202; G06Q 50/30; G06Q 10/06311
See application file for complete search history.

(56) References Cited

U.S. PATENT DOCUMENTS

| | | | |
|---|---|---|---|
| 10,248,120 B1* | 4/2019 | Siegel | G05D 1/0223 |
| 10,360,801 B2* | 7/2019 | Taylor | G08G 5/0091 |
| 10,438,137 B2 | 10/2019 | Ratti et al. | |
| 10,679,096 B2 | 6/2020 | Lee et al. | |
| 11,288,603 B2 | 3/2022 | Ratti et al. | |

(Continued)

FOREIGN PATENT DOCUMENTS

RU    2014-147760 A    6/2016

OTHER PUBLICATIONS

Zhan, X., Qian, X., & Ukkusuri, S. V. (Aug. 2014). Measuring the efficiency of urban taxi service system. In The Third International Workshop on Urban Computing (UrbComp'14). https://www.cs.uic.edu/~urbcomp2013/urbcomp2014/papers/Zhang_Efficiency_taxi.pdf (Year: 2014).*

(Continued)

*Primary Examiner* — Matheus Ribeiro Stivaletti
(74) *Attorney, Agent, or Firm* — Wolf, Greenfield & Sacks, P.C.

(57) ABSTRACT

Real-time, point-to-point, on-demand ride dispatching system. The system provides for optimal operation including a fleet dimensioning module for determining an optimal number of vehicles in a fleet needed to serve a collection of trip requests, and a vehicle dispatching module for dispatching the fleet of vehicles to serve a selected number of trip requests. The fleet dimensioning module employs a shareability network to model trip requests that can be served by a same vehicle to find the minimum number of vehicles in the fleet to serve all trip requests in the collection of trip requests.

20 Claims, 1 Drawing Sheet

(56) References Cited

U.S. PATENT DOCUMENTS

| | | | |
|---|---|---|---|
| 11,694,129 B2* | 7/2023 | Braysy | G06Q 10/0633 |
| | | | 705/7.27 |
| 2009/0187450 A1* | 7/2009 | Kocis | G06Q 10/083 |
| | | | 705/331 |
| 2010/0088163 A1* | 4/2010 | Davidson | G07C 5/02 |
| | | | 340/425.5 |
| 2010/0299177 A1* | 11/2010 | Buczkowski | G06Q 50/30 |
| | | | 705/7.13 |
| 2011/0238457 A1* | 9/2011 | Mason | G06Q 10/063112 |
| | | | 705/7.14 |
| 2011/0246404 A1* | 10/2011 | Lehmann | G06Q 50/14 |
| | | | 706/21 |
| 2012/0041675 A1* | 2/2012 | Juliver | G06Q 30/0283 |
| | | | 701/465 |
| 2012/0232943 A1 | 9/2012 | Myr | |
| 2013/0096827 A1 | 4/2013 | McCall et al. | |
| 2014/0188775 A1 | 7/2014 | Lehmann et al. | |
| 2014/0344778 A1 | 11/2014 | Lau et al. | |
| 2015/0161554 A1* | 6/2015 | Sweeney | G06Q 10/08355 |
| | | | 705/7.15 |
| 2015/0324718 A1 | 11/2015 | Lord et al. | |
| 2015/0324944 A1* | 11/2015 | Lord | G01C 21/3438 |
| | | | 705/7.13 |
| 2015/0339595 A1* | 11/2015 | Soutter | G06Q 30/0207 |
| | | | 705/5 |
| 2015/0339928 A1* | 11/2015 | Ramanujam | G06Q 50/30 |
| | | | 701/23 |
| 2016/0027306 A1 | 1/2016 | Lambert et al. | |
| 2016/0069699 A1* | 3/2016 | Chen | G01C 21/3682 |
| | | | 701/426 |
| 2016/0098650 A1 | 4/2016 | Ratti et al. | |
| 2016/0209220 A1* | 7/2016 | Laetz | G08G 1/202 |
| 2016/0247106 A1* | 8/2016 | Dalloro | G06Q 10/063 |
| 2016/0273922 A1* | 9/2016 | Stefan | G06Q 10/00 |
| 2016/0292596 A1 | 10/2016 | Gaitan et al. | |
| 2016/0300186 A1* | 10/2016 | Scharaswak | G06Q 10/0835 |
| 2016/0328514 A1 | 11/2016 | Turk | |
| 2016/0342946 A1* | 11/2016 | Herraiz Herraiz | G06Q 10/08 |
| 2016/0364823 A1* | 12/2016 | Cao | G06Q 50/30 |
| 2016/0368600 A1* | 12/2016 | Frolov | B64C 39/10 |
| 2017/0068917 A1* | 3/2017 | Rackley | G06Q 10/06313 |
| 2017/0123421 A1* | 5/2017 | Kentley | G08G 1/202 |
| 2017/0138749 A1* | 5/2017 | Pan | G01C 21/3438 |
| 2017/0147951 A1* | 5/2017 | Meyer | G06Q 10/02 |
| 2017/0301054 A1* | 10/2017 | Sangoi | G06Q 10/02 |
| 2017/0336219 A1* | 11/2017 | Di Lorenzo | G06Q 10/047 |
| 2018/0018572 A1* | 1/2018 | Wang | G06Q 10/04 |
| 2018/0096606 A1* | 4/2018 | Moreira-Matias | G08G 1/202 |
| 2018/0204158 A1 | 7/2018 | Ratti et al. | |
| 2019/0065890 A1 | 2/2019 | Lee et al. | |
| 2020/0057967 A1 | 2/2020 | Ratti et al. | |

OTHER PUBLICATIONS

Santi, P., Resta, G., Szell, M., Sobolevsky, S., Strogatz, S. H., & Ratti, C. (2014). Quantifying the benefits of vehicle pooling with shareability networks. Proceedings of the National Academy of Sciences, 111(37), 13290-13294. (Year: 2014).*

Zhan, X., Qian, X., & Ukkusuri, S. V. (2016). A graph-based approach to measuring the efficiency of an urban taxi service system. IEEE Transactions on Intelligent Transportation Systems, 17(9), 2479-2489. (Year: 2016).*

X. Zhan, X. Qian and S. V. Ukkusuri, "A Graph-Based Approach to Measuring the Efficiency of an Urban Taxi Service System," in IEEE Transactions on Intelligent Transportation Systems, vol. 17, No. 9, pp. 2479-2489, Sep. 2016, doi: 10.1109/TITS.2016.2521862. Date of Publication: Apr. 20, 2016 (Year: 2016).*

PCT/US2018/014333, Apr. 23, 2018, International Search Report and Written Opinion.

International Search Report and Written Opinion mailed Apr. 23, 2018 in connection with International Application No. PCT/US2018/014333.

O. Sagarra et al, "Supersampling and Network Reconstruction of Urban Mobility", *PLOS One*, San Francisco, CA, 2015.

New York Taxi and Limousine Commission, "2014 Taxicab Fact Book", New York City, 2014.

U.S. Appl. No. 14/507,299, filed Oct. 6, 2014, Ratti et al.

P. Santi et al., Quantifying the benefits of vehicle pooling with shareability networks. PNAS. Sep. 16, 2014; 111(37):13290-13294.

Wang, Optimizing Ride Matches for Dynamic Ride-Sharing Systems. Ph.D. Thesis. Georgia Institute of Technology. May 2013; 125 pages.

International Preliminary Report on Patentability mailed Aug. 1, 2019 in connection with International Application No. PCT/US2018/014333.

Extended European Search Report dated May 4, 2020 in connection with European Application No. 18741262.2.

Alonso-Mora et al., On-demand high-capacity ride-sharing via dynamic trip-vehicle assignment. PNAS. Jan. 17, 2017;114(3):462-467.

U.S. Appl. No. 16/553,770, filed Aug. 28, 2019, Ratti et al.

PCT/US2018/014333, Aug. 1, 2019, International Preliminary Report on Patentability.

EP 18741262.2, May 4, 2020, Extended European Search Report.

[No Author Listed], "Minimum path cover". Google. Nov. 23, 2020:18 pages. https://www.google.com/search?ei=Nhy8X7e3KYKy5wL0-begAg&q=%22minimum+path+cover%22&oq=%22minimum+path+cover%22&gs_lcp=CgZwc3ktYWIQAzICCAAyAggAMgIIADIECAAQHjIECAAQHjIECAAQHjIECAAQHjIECAAQHjIGCAAQCBAeOgGQIABBHOgUIABDJAzoGCAAQFhAeOgQIABBDUMCRAVjtrAFg6q0BaABwAngAgAFUiAHYAZIBATOYAQCgAQGqAQdnd3Mtd2l6yAEIwAEB&sclient=psy-ab&ved=0ahUKEwi3qoWswZntAhUC2VkKHfT8DSQQ4dUDCA0&uact=5 [last accessed Nov. 23, 2020].

[No Author Listed], Path cover. Wikipedia. Aug. 20, 2020:2 pages. https://en.wikipedia.org/wiki/Path_cover [last accessed Nov. 23, 2020].

Cormen et al., Problems for Chapter 26. In: Introduction to algorithms, 3rd Edition. The MIT Press. 2009. Cormen et al., Chapter 26:761.

Johnson et al., Maximum Multiplicity for Trees, I. In: Eigenvalues, multiplicities and graphs, 1st Edition. Cambridge University Press. Feb. 12, 2018. Johnson et al., Eds. Chapter 3:51-52.

Rizzi et al., On the complexity of minimum path cover with subpath constraints for multi-assembly. BMC bioinformatics. Sep. 1, 2014;15(S9):11 pages.

Communication pursuant to Article 94(3) EPC mailed Nov. 10, 2021 in connection with European Application No. 18741262.2.

No Author Listed, NP-Complete—A Rough Guide. 2018;4 pages. https://www.mathsisfun.com/sets/np-complete.html [Last accessed Nov. 16, 2021].

No Author Listed, NP-Completeness | Set 1 (Introduction). Sep. 27, 2021;8 pages. https://www.geeksforgeeks.org/np-completeness-set-1/?ref=1bp [Last accessed Nov. 16, 2021].

No Author Listed, NP-completeness. Wikipedia, The Free Encyclopedia. Oct. 6, 2021;9 pages. https://en.wikipedia.org/w/index.php?title=NP-completeness&oldid=1048495842 [Last accessed Nov. 16, 2021].

Di Febbraro et al., Optimization of dynamic ridesharing systems. Transportation research record. 2013;2359(1):44-50.

Johnson, A brief history of NP-completeness, 1954-2012. Documenta Mathematica. 2012:359-76.

[No Author Listed], NP (complexity). Wikipedia. Jul. 2022. 5 pages. https://en.wikipedia.org/wiki/NP_(complexity) [Last accessed Jul. 13, 2022].

* cited by examiner

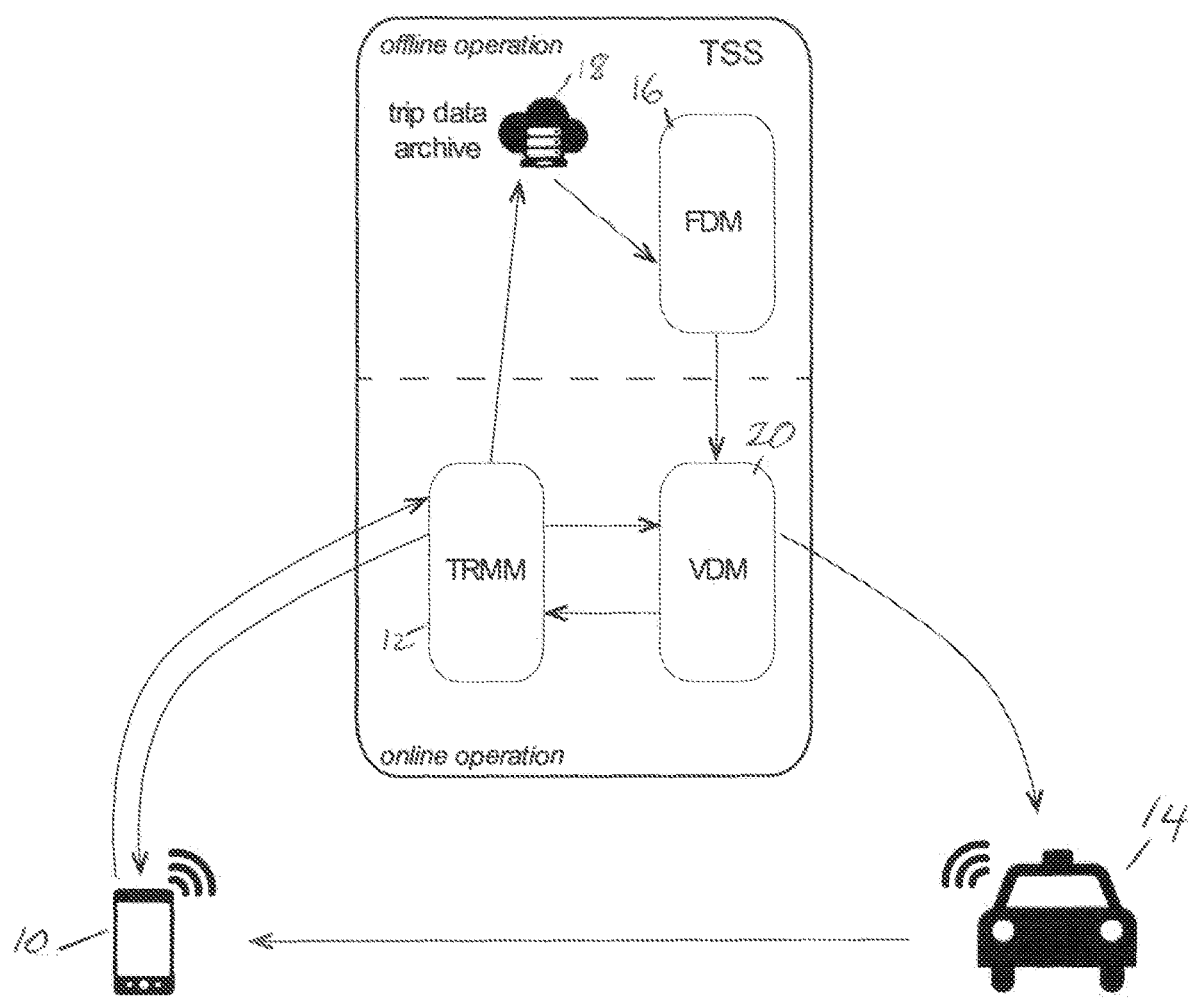

DATA-DRIVEN SYSTEM FOR OPTIMAL VEHICLE FLEET DIMENSIONING AND REAL-TIME DISPATCHING BASED ON SHAREABILITY NETWORKS

BACKGROUND OF THE INVENTION

Ride hailing and sharing companies such as Uber and Lyft receive trip requests from patrons and dispatch vehicles to pick up these patrons. To the best of the inventors' knowledge, no approach for efficient computation of the minimum number of vehicles needed to accommodate a certain mobility demand exists. Nor is there, in the prior art, an optimized, computationally efficient vehicle dispatching method that uses the computed minimum number of vehicles.

The present invention has as an object the providing of a data-driven system for determining the optimum number of vehicles needed to serve a collection of trip requests. It is also an object to define an optimized, real-time vehicle dispatching method when the fleet of vehicles operates with optimal vehicle deployment. A further object is to implement a real-time, point-to-point, on-demand ride sharing system with optimal operation.

SUMMARY OF THE INVENTION

In one aspect, the invention is a real-time, point-to-point, on-demand ride sharing system for optimal operation including a fleet dimensioning module for determining an optimal number of vehicles in a fleet needed to serve a collection of trip requests. A vehicle dispatching module dispatches the fleet of vehicles to serve a selected number of trip requests. In a preferred embodiment, the fleet dimensioning module processes periodically off-line historical trip information to determine optimal vehicle fleet size. In this embodiment, the fleet dimensioning module employs a shareability network to model trip requests that can be served by the same vehicle to find the minimum number of vehicles in the fleet to serve all trip requests in the collection of trip requests.

In another preferred embodiment, the vehicle dispatching module operates on-line in real time. It is preferred that the system include a central server to build and maintain, as requests arrive, a shareability network comprising a mathematical model of sharing opportunities between pairs or triplets of trips. In this embodiment, the central server computes an optimal matching of trips in the shareability network and delivers an output of the optimal matching of trips computation to the vehicle dispatching module. In another preferred embodiment, the central server computes the optimal matching at a prescribed time interval. The vehicle dispatching module may optimally assign available vehicles to shared trip requests, notify patrons of estimated pick up time, and notify vehicle drivers to pick up prescribed patrons.

It is preferred that the system include a mobile device such as a smartphone or tablet for interaction with the fleet dimensioning module and vehicle dispatching module. A preferred embodiment further includes a transportation service system operated by a point-to-point transportation provider having a trip data archive, fleet dimensioning module, vehicle dispatching module, along with a trip request and matching module to collect and respond to trip requests.

BRIEF DESCRIPTION OF THE DRAWING

FIG. 1 is a schematic illustration of an embodiment of the invention disclosed herein.

DESCRIPTION OF THE PREFERRED EMBODIMENT

The invention disclosed herein comprises two main sub-systems: an off-line, fleet dimensioning module (FDM) which is loaded with historical trip information and executed periodically (e.g., on a daily basis) to determine the optimal vehicle fleet size; and an on-line, real-time vehicle dispatching module (VDM) which dispatches the optimally dimensioned fleet of vehicles to serve a number of trip requests. The FDM uses a novel type of shareability network to model trip requests that can be served by the same vehicle and finds the provably optimal minimum number of vehicles needed to serve all trips.

The FDM and VDM modules are then used to implement a real-time, on-demand, point-to-point mobility service that includes the possibility of sharing a ride. Trip requests issued by patrons through their smartphone or similar mobile device are delivered to a central server. As requests arrive, the server builds and maintains a shareability network that is a mathematical model of sharing opportunities between pairs and triplets of trips according to the method described in US Patent Application Publication US2016/0098650 [3]. This published application is incorporated herein by reference. At a prescribed time interval T (e.g., one minute), the central server computes the optimal matching of the trips in the current shareability network and returns the results of the computation to the VDM module. The VDM component decides assignment of available vehicles to shared trip requests according to an optimized strategy. This module also notifies patrons of an estimated pickup time, notifies vehicle drivers (or on board self-driving systems) to pick up the prescribed patrons.

The architecture of an embodiment of the system of the invention is shown in FIG. 1. A mobile device such as a smartphone 10 allows a patron to interact with the disclosed system.

The mobile device 10 communicates a request to a trip request and matching module (TRMM) that collects and responds to patron trip requests in real time and possibly provides matches for ride sharing.

The system, referred to as a transportation service system (TSS) is operated by a point-to-point transportation provider such as one of the ride hailing services referred to above. The system also includes a fleet of vehicles represented by the vehicle 14.

As shown in FIG. 1, above the dashed line is a fleet dimensioning module (FDM) 16 that, based on historic trip information provided by a trip data archive 18, periodically (e.g., once a day) computes the optimal size of the vehicle fleet to be deployed to service patron trip requests. The components shown in FIG. 1 communicate with one another by means of wireless communication (cellular, wi-fi, or the like).

Still referring to FIG. 1 a vehicle dispatching module (VDM) 20 determines in real time the optimized dispatching of vehicles to serve trip requests. The trip data archive 18 feeds trip information to FDM 16 that computes the optimal fleet size for a next period of time. For example, this operation can occur during the night, and the optimal fleet size for the next day is computed. The FDM 16 uses trip data information as follows. First, trip data information relevant to a next upcoming period is considered. For example, if the next day is a Friday, trip data collected during a past Friday, or a statistical mix of trips performed during a number of past days, is considered. The strong statistical stationarity of aggregate trip data information, as observed in several scientific studies including that in reference [1], ensures that the statistical properties of future trips occurring during the next period will be almost identical to those derived from the archived data.

Trip data information is composed of a number of trip records, where the record for trip A contains the pickup location $P_A$ (e.g., latitude and longitude information derived from GPS) the trip request time $t_{PA}$, drop off location $D_A$, and the drop off time $t_{DA}$. If trip request time is not available, $t_{PA}$ can instead represent the pickup time at $P_A$.

The FDM 16 takes the collection of relevant trip records and builds a data structure called a vehicle shareability network (VSN) as follows. The data structure has an element for each trip in the collection, plus a number of directed references (directed links) to other elements in the 110 data structure. More specifically, consider any two trips A and B. A directed reference (directed link) to B in the element of the data structure corresponding to A is included if and only if both of the following conditions are satisfied:

$$t_{PA}+T_A+T_{AB}<=t_{PB}$$

$$T_{AB}<=TV.$$

In the formulas above, $T_A$ is the travel time from $P_A$ to $D_A$, $T_{AB}$ the travel time from $D_A$ to $P_B$, and TV is a tunable parameter used to upper bound the vacant time of a vehicle when serving consecutive requests. Thus, a directed link from A to B in the data structure indicates that it is possible to serve trip A and trip B with a single vehicle, guaranteeing absence of waiting for the patron who requested trip B. Travel times between different points in a city can be obtained with standard techniques (e.g., using Google Map APIs).

The FDM 16 uses the VSM data structure to compute the minimum number N of vehicles needed to serve all trips in the collection of relevant trips by running an algorithm for finding the minimum path cover on a directed network. The number of paths in the minimum cover returned by the algorithm corresponds to the sought minimum number of vehicles in the fleet N. The fact that the computed VSN is a directed acyclic graph (see reference [2] for a proof) guarantees that the minimum path cover can be found in polynomial time (i.e., the algorithm used is computationally efficient). In order to account for the fact that N has been estimated using the entire knowledge of daily trips while the VDM 20 operates in real time, and to account for statistical deviations from historical data that are possible (although typically negligible), the number of deployed vehicles in the next upcoming period is defined as NF=c·N, where c>1 is a tunable parameter that allows the TSS operator to trade off between customer quality of service, cost and vehicle vacant time. Optionally, NF can be fine tuned by simulating the operation of the TRRM 12-VDM 20 components on the collection of trips.

In operation a patron A accesses the point-to-point transportation application on her mobile device 10, and requests a trip by issuing a trip request $R_A$; the trip is specified by including in the request the following information: a pickup location $P_A$ (which can be derived from the GPS of the mobile device), a dropoff location $D_A$ (e.g., an address), the desired pickup time to (e.g., from now on) and the number $n_A$ of passengers requesting the trip. The application offers the patron the possibility of requesting a shared trip, which can be done by pressing a suitable SHARE button in the app GUI. The patron is informed by the application that, in case she presses the SHARE button, she will receive a response from the system within a time T, where T is a system parameter chosen by the transportation service provider. Whether the requested trip is shareable is indicated in the trip request through a shareability field $S_A$ set to 1 if the trip is shareable, and set to 0 otherwise. The trip request is transmitted to the TSS by means of wireless communication, e.g. using an available cellular of WiFi connection. The trip request is received by the TRMM 12 which performs the actions described below.

The request is forwarded directly to the VDM 20 component if the shareability field $S_A$ in the request is set to 0; otherwise, the optimal ride sharing option for RA is computed using the approach described in the related published patent application [3]. If a matching trip for $R_A$ is found—say, trip $R_B$—a new trip request $R_{AB}$ is formed as follows. The trip matching algorithm described in [3] computes, along with the optimal matching, also the route that connect the pickup/dropoff points of the shared trips. Assume without loss of generality that the computed route is $P_A,P_B,D_A,D_B$. The combined trip request $R_{AB}$ is then defined as follows: $P_{AB}=P_A$, $t_{AB}=t_A$, $D_{AB}=D_B$, $n_{AB}=n_A+n_B$. Those of ordinary skill in the art understand how to build the combined trip request $R_{AB}$ in case the computed route is $P_A,P_B,D_B,D_A$, or $P_B,P_A,D_A,D_B$, or $P_B,P_A,D_B,D_A$. The combined trip request $R_{AB}$ is then forwarded to the VDM 20 component.

The TRMM 12 component forwards the trip request information (request $R_A$, or combined request $R_{AB}$ depending on whether a shared ride has been requested) to the trip data archive. The VDM 20 component receives trip requests from the TRMM 12 component. Trip requests can be either simple or combined. Two embodiments of the invention are considered. In one embodiment, VDM 20 processes trip requests sequentially, while in the other requests are processed in batches. We first describe the sequential processing embodiment. Let t be the time at which VDM 20 receives a trip request $R_A$. A candidate vehicle set $V(R_A)$ for $R_A$ is computed by considering all vehicles that can reach $P_A$ within time $t_A+\Delta$, where $\Delta>=0$ is a tunable parameter set by the TSS operator. Vehicles in $V(R_A)$ can be either vehicles currently not serving any request, or vehicles which are able to finish serving the patron they are currently serving and reach $P_A$ within the prescribed time. Notice that when building $V(R_A)$ VDM 20 is not considering the possibility of re-routing a vehicle who is currently serving a patron. This choice is done to preserve customer quality of service and quality of experience. However, in case the TSS operator decides to apply vehicle re-routing, set $V(R_A)$ can be straightforwardly extended to include also vehicles that are currently servicing a patron, but can be re-routed and reach $P_A$ within the prescribed time.

Once set $V(R_A)$ is built, the best vehicle $V_A$ to serve $R_A$ is selected within $V(R_A)$ according to some optimization metric (e.g., minimize waiting time for the patron, reduce vehicle vacant operation/traveled miles, preserve vehicle fleet balancing, etc.). In case $V(R_A)$ is empty, the process can be repeated by selecting a larger $\Delta$. In the batched operation embodiment, trip requests are collected and processed in batches every TD seconds, where TD is a tunable parameter chosen by the transportation provider. Let $R_1, \ldots, R_k$ be the requests to be processed in a batch, and $V(R_1), \ldots, V(R_k)$ be the respective candidate vehicle sets. A network is then formed by adding a node for each trip request, a node for each vehicle in $V(R_1) \cup \ldots \cup V(R_k)$ (i.e., vehicles that are in the candidate set of at least one request), and adding an undirected link between the node corresponding to $R_i$ and that corresponding to vehicle $V_j$ if and only if $V_j \in V(R_i)$. It is clear to see that the resulting network is a bipartite network. The best assignment of vehicles to trip requests is then computed by running a maximum matching algorithm on the formed bipartite network. Alternatively, weights can be assigned to links in the network (corresponding, e.g., to patron waiting time, vehicle vacant time, vehicle traveled miles, etc.), and the optimal solution can be computed using a maximum weighted matching algorithm. At the end of this process, vehicles 14 can be assigned to the respective trip request by considering links in the maximum (weighted) matching: if a link in the matching connects request $R_i$ and vehicle $V_j$, vehicle $V_j$ will be selected to serve request $R_i$. In case some $R_i$ is not part of the computed matching (and, thus, remain unserved), it can be re-considered for matching in the next batch. Alternatively, the matching can be recomputed using a larger value of $\Delta$. After vehicles are assigned to trip requests according to either the sequential or batched operation, information about which vehicle will serve a certain trip request is returned to the TRMM 12 component.

Vehicles selected to serve a trip request are informed by the VDM 20 through wireless communication. Transmitted information includes detail of the trip they have to serve (pickup point(s), number of passengers, etc.). The TRMM 12 component informs the patron(s) that the request will be served by a certain vehicle, providing her vehicle details and position tracking, estimated pickup time, etc. The vehicle picks up the patron(s).

Notice that optimal fleet dimensioning as performed by the FDM 16 component ensures that target system performance parameters as set by the TSS operator (e.g., in terms of average vehicle vacant time, total traveled miles, operational costs, customer quality of service, etc.) can be met. Due to mobility demand fluctuations (e.g., week days vs. weekend) it is possible that the computed optimal number of vehicles in a fleet varies significantly in different operational periods. This can present opportunities for regularly servicing vehicles in the fleet, or for using vehicles for different activities (e.g., parcel delivery) during periods of low mobility demand.

Our invention represents a breakthrough in vehicle fleet operation optimization. The invention not only optimally dimensions the vehicle fleet leveraging big data and statistical modeling, but it also provides an optimized, computationally efficient vehicle dispatching method, and full integration with the optimal ride sharing method described in [3].

Initial experiments performed using GPS taxi trips data in the city of New York, have shown that in a typical NY week day when approximately 500,000 taxi trips are requested, those trips can be served by approximately 6,000 vehicles with an upper bound on vehicle vacant time between successive trips in the order of 10 minutes, and no delay imposed to patrons. This is about a factor two reduction with respect to the current number of approximately 12,000 taxis currently active in NY in a typical day [4].

Thus, with our optimized operation, the number of taxis could potentially be halved while serving the same number of patrons with no additional delay. Even more impressive: if trips are shared, the total number of operating taxis can be reduced to approximately 4,000.

Most importantly, all the algorithms used in the invention are extremely efficient, and can be executed in real time on standard Linux servers.

Modifications and variations of the present invention will be apparent to those of ordinary skill in the art and all such modifications and variations are included within the scope of the appended claims.

The references listed herein are incorporated herein in their entirety by reference.

REFERENCES

[1] O. Sagarra, M. Szell, P. Santi, A. Diaz-Guilera, C. Ratti, "Supersampling and Network Reconstruction of Urban Mobility", PLOS One, 2015.
[2] C. Ratti, G. Resta, P. Santi, "Quantifying the Benefits of Sharing Economy in Urban Transportation through Shareability Networks", unpublished draft, 2015.
[3] C. Ratti, P. Santi, "A System for Real-Time Optimal Matching of Ride Sharing Requests", Patent Application Publication US 2016/0098650.
[4] New York Taxi and Limousine Commission, "2014 Taxicab Fact Book", available online, 2014.

What is claimed is:

1. A real-time, point-to-point, on-demand car sharing system comprising:
   a fleet dimensioning module ("FDM"), executed by at least one processor, for determining an optimal number of vehicles in a fleet needed to serve a collection of trip requests, wherein the at least one processor when executing is configured to:
      access historical trip information for transformation of the historical trip information into an acyclic directed network graph based data structure;
      select a future time period having a duration of at least a day and corresponding to at least one day of the week on which to determine an optimal number of vehicles to service a future time period;
      define a first historical time period to analyze to estimate the optimal number of vehicles for the future time period based on matching the at least one day of the week or based on a statistical mix of trips performed during a number of past days, the first historical time period spanning at least thousands of trip requests;
      select trip information including the at least thousands of trip requests from the historical trip information associated with the first historical time period on which to build the acyclic direct network graph based data structure;
      generate the acyclic directed network graph based data structure with data elements on the selected trip information including the at least thousands of trip requests, wherein each data element corresponds to a trip in the first historical time period, and includes a pickup location, a trip request time or pickup time, and a drop off location, and the acyclic directed network graph based data structure reflects the thousands of trip requests;
      create a plurality of directed links between the data elements within the acyclic directed network graph based data structure, wherein each directed link is created between the data elements responsive to determining for a pair of data elements that respective first and second trips of the pair from the first historical time period can be serviced with one vehicle;
      enable polynomial time execution of subsequent operation based upon storing the trip information as the data elements and the serviced with one vehicle determination for the thousands of trip requests as the directed links between the data elements in the acyclic directed network graph based data structure;
      determine, prior to receiving ride requests of the future time period, the optimal number of vehicles needed for the future time period based on, at least in part, executing a minimum path cover on the acyclic directed network graph based data structure, wherein executing the minimum path cover includes counting a minimum number of paths that cover the data elements and the directed links between them in the acyclic directed network graph based data structure in polynomial time;

define a tunable parameter to account for statistical deviations from historical data and constrain the tunable parameter to have a value greater than one;

adjust a number of vehicles by increasing the determined optimal number of vehicles based on the tunable parameter defined on the system, wherein adjusting includes multiplying the determined optimal number of vehicles by the tunable parameter;

tune the number of vehicles responsive to simulating vehicle dispatching functions simulate sequential and batch assignment of rides, wherein the simulation of the sequential and batch assignment of rides includes at least: assigning weight values to links in a network data structure reflecting patron wait time, vehicle vacant time, vehicle travelled miles, resolving unmatched rides based on expanding initial parameters, and enabling simulated ride assignment to occur within parameters set by a transportation provider;

provision, prior to receiving ride requests of the future time period, the adjusted and tuned number of vehicles for a fleet of vehicles to support dispatching operations; and the vehicle dispatching module ("VDM"), executed by at least one processor, wherein the at least one processor when executing is configured to:

accept current ride requests during the future time period;

match the current ride request to available vehicles in real-time; and dispatch respective ones of the fleet of vehicles to serve active trip requests in response to accepting and matching trip requests from end users during the future time period.

2. The system of claim 1, wherein the fleet dimensioning module processes periodically off-line historical trip information to determine the estimate for the optimal vehicle fleet size.

3. The system of claim 1, wherein the vehicle dispatching module operates on-line in real time.

4. The system of claim 1, wherein the system includes a central server to build and maintain, as requests arrive, a shareability network comprising a mathematical model of sharing opportunities between pairs or sets of trips.

5. The system of claim 4, wherein the central server computes an optimal matching of trips in the shareability network and delivers an output of the optimal matching of trips computation to the vehicle dispatching module.

6. The system of claim 5, wherein the central server computes the optimal matching at a prescribed time interval.

7. The system of claim 5, wherein the vehicle dispatching module optimally assigns available vehicles to share trip requests, notifies patrons of estimated pickup time, and notifies vehicle drivers to pick up prescribed patrons.

8. The system of claim 1, wherein the determining includes a search using the acyclic directed network graph based data structure for a minimum number of unique paths touching each data node of the data structure.

9. The system of claim 8, further including a transportation service system operated by a point-to-point transportation provider comprising a trip data archive, the fleet dimensioning module and the vehicle dispatching module along with a trip request and matching module to collect and respond to trip requests.

10. The system of claim 1, wherein the FDM is configured to determine travel time for a first trip and a travel time to a second pickup location does not exceed a pickup time associated with the second pickup up location as a condition of determining it is possible to serve the trip request and the at least another trip request with one vehicle.

11. The system of claim 1, wherein the FDM is configured to determine that a travel time from a first destination to a subsequent pickup location does not exceed a vehicle vacancy threshold prior to generating directed connections within the direct network data structure.

12. The system of claim 11, wherein the FDM is configured to access a system defined time for the vehicle vacancy threshold.

13. The system of claim 12, wherein the system is configured to accept user input to establish or update the vehicle vacancy threshold.

14. The system of claim 1, wherein in the system is configured to adjust an optimal fleet size according to a user tunable factor.

15. The system of claim 1, wherein the VDM determines a vehicle to service a ride request limited by a delay parameter.

16. The system of claim 15, wherein the VDM is configured to automatically increase the delay parameter if no candidate vehicles are identified to service the ride request.

17. The system of claim 15, wherein the VDM is configured to select from a set of candidate vehicles that are not currently serving any request or a set of candidate vehicles which are able to finish serving a current trip and reach a pickup location within a prescribed time, avoiding re-routing a vehicle currently serving a patron.

18. The system of claim 1, wherein the VDM is configured to collect and process batches of trip requests based on a system specified time period.

19. A real-time, point-to-point, on-demand car sharing method comprising:

determining, by a computer system executing a fleet dimensioning module, an optimal number of vehicles in a fleet needed to serve a collection of trip requests, wherein the act of determining includes:

accessing, by the computer system, historical trip information for transformation of the historical trip information into an acyclic directed network graph based data structure;

selecting, by the computer system, a future time period having a duration of at least a day and corresponding to at least one day of the week on which to determine an optimal number of vehicles to service a future time period;

defining, by the computer system, a first historical time period to analyze to estimate the optimal number of vehicles for the future time period based on matching the at least one day of the week or based on a statistical mix of trips performed during a number of past days, the first historical time period spanning at least thousands of trip requests;

selecting trip information including the at least thousands of trip requests from the historical trip information associated with the first historical time period based on the future time period on which to build the acyclic direct network graph based data structure;

building, by the computer system, the acyclic directed network data structure with data elements on the selected trip information including the at least thousands of trip requests, wherein each data element corresponds to a trip in the first historical time period, and includes a pickup location, a trip request time or pickup time, and a drop off location, and the acyclic directed network graph based data structure reflects the thousands of trip requests;

generating, by the computer system, a plurality of directed links between the data elements within the acyclic directed network graph based data structure, wherein each directed link is created between the data elements responsive to determining for a pair of data elements that respective first and second trips from the first historical time period can be serviced with one vehicle;

enable polynomial time execution of subsequent operation based upon storing the trip information as the data elements and the serviced with one vehicle determination for the thousands of trip requests as the directed links between the data elements in the acyclic directed network graph based data structure;

determining, by the computer system prior to receiving ride requests of the future time period, an estimate for the optimal number of vehicles needed for the future time period based on, at least in part executing a minimum path cover on the acyclic directed network graph based data structure, wherein executing the minimum path cover includes counting a minimum number of paths that cover the data elements and the directed links between them in the acyclic directed network graph based data structure;

defining, by the computer system, a tunable parameter to account for statistical deviations from historical data and constrain the tunable parameter to have a value greater than one;

adjusting, by the computer system, a number of vehicles by increasing the determined optimal number of vehicles based on the tunable parameter defined on the system, wherein adjusting includes multiplying the determined optimal number of vehicles by the tunable parameter;

tuning, by the computer system, the number of vehicles responsive to simulating vehicle dispatching functions;

simulating, by the computer system, sequential and batch assignment of rides, wherein the simulation of the sequential and batch assignment of rides includes at least: assigning weight values to links in a network data structure reflecting patron wait time, vehicle vacant time, vehicle travelled miles, resolving unmatched rides based on expanding initial parameters, and enabling simulated ride assignment to occur within parameters set by a transportation provider;

provisioning, by the computer system, prior to receiving ride requests of the future time period, the adjusted and tuned number of vehicles in a fleet of vehicles to support dispatching operations; and dispatching, by the computer system executing a vehicle dispatching module, respective ones of the fleet of vehicles to serve active trip requests in response to accepting and matching trip requests from end users during the future time period.

20. At least one non-transitory computer-readable storage medium storing processor-executable instructions that, when executed by at least one computer hardware processor, cause the at least one computer hardware processor to perform a method for real-time, point-to-point, on-demand car sharing, the method comprising:

determining an optimal number of vehicles in a fleet needed to serve a collection of trip requests wherein the act of determining includes:

accessing historical trip information for transformation of the historical trip information into an acyclic directed network graph based data structure;

selecting a future time period having a duration of at least a day and corresponding to at least one day of the week on which to determine an optimal number of vehicles to service a future time period;

defining a first historical time period to analyze to estimate the optimal number of vehicles for the future time period based on matching the at least one day of the week or based on a statistical mix of trips performed during a number of past days, the first historical time period spanning at least thousands of trip requests;

selecting trip information including the at least thousands of trip requests from the historical trip information associated with the first historical time period based on a future time period on which to build the acyclic direct network graph based data structure;

building the acyclic directed network graph based data structure with data elements on the selected trip information including the at least thousands of trip requests, wherein each data element corresponds to a trip in the first historical time period, and includes a pickup location, a trip request time or pickup time, and a drop off location, and the acyclic directed network graph based data structure reflects the thousands of trip requests;

generating a plurality of directed links between the data elements within the acyclic directed network graph based data structure, wherein each directed link is created between the data elements responsive to determining for a pair of data elements that respective first and second trips from the first historical time period can be serviced with one vehicle, and wherein the acyclic directed network graph based data structure reflects the thousands of trip requests;

enable polynomial time execution of subsequent operation based upon storing the trip information as the data elements and the serviced with one vehicle determination for the thousands of trip requests as the directed links between the data elements in the acyclic directed network graph based data structure;

determining, prior to receiving ride requests of the future time period, an estimate for the optimal number of vehicles needed for the future time period based on, at least in part executing a minimum path cover on the acyclic directed network graph based data structure wherein executing the minimum path cover includes counting a minimum number of paths that cover the data elements and the directed links between them in the acyclic directed network graph based data structure;

defining a tunable parameter to account for statistical deviations from historical data and constrain the tunable parameter to have a value greater than one;

adjusting a number of vehicles by increasing the determined optimal number of vehicles based on the tunable parameter defined on the system, wherein adjusting includes multiplying the determined optimal number of vehicles by the tunable parameter;

tuning the number of vehicles responsive to simulating vehicle dispatching functions;

simulating sequential and batch assignment of rides, wherein the simulation of the sequential and batch assignment of rides includes at least: assigning weight values to links in a network data structure reflecting patron wait time, vehicle vacant time, vehicle travelled miles, resolving unmatched rides based on expanding initial parameters, and enabling simulated ride assignment to occur within parameters set by a transportation provider;

provisioning, prior to receiving ride requests of the future time period, the adjusted and tuned number of vehicles in a fleet of vehicles to support dispatching operations; and dispatching, by the computer system executing a vehicle dispatching module, respective ones of the fleet of vehicles to serve active trip requests in response to accepting and matching current trip requests from end users during the future time period.

* * * * *